Oct. 8, 1963  D. GELBART  3,106,394
FISHING GAME
Filed May 26, 1961

INVENTOR.
DAVID GELBART
BY

United States Patent Office 3,106,394
Patented Oct. 8, 1963

---

3,106,394
FISHING GAME
David Gelbart, 5121 Webster, Omaha, Nebr.
Filed May 26, 1961, Ser. No. 112,801
1 Claim. (Cl. 272—8)

This invention relates to games or toys of the aquatic type in which objects are driven through water by jet action, and in particular an open container with water circulating means at one end and with a horizontally disposed partition having openings at the ends spaced upwardly from the base and having an elevated portion on the end spaced from the circulating means whereby water circulated by jets carries objects, such as fish, through water above the partition, downwardly through the far end of the partition, forwardly below the partition and upwardly over the elevated portion of the partition.

The purpose of this invention is to provide a fishing game in which the fish are moving continuously, and in which the fish remain substantially midway between the surface of the water and bottom of a receptacle in which water and fish are positioned.

In substantially all games where fish are positioned in water the fish either float on top of the water or sink to the bottom where the fish remain. In all instances where fish float on water in a container, or remain on the bottom, they give the impression of dead fish and interest in the game wanes.

With this thought in mind this invention contemplates an open container having jets at both ends whereby water is circulated above and below a horizontal partition and fish positioned in the container are provided with adjustable weights so that only sufficient weight is added to retain the fish suspended just below the surface of the water.

The object of this invention is, therefore, to provide a fishing game in which means is provided for keeping fish in the game moving continuously.

Another object of the invention is to provide a fishing game in which fish are caught by magnets suspended by a fishing line.

Another important object of the invention is to provide a fishing game in which fish are suspended in water continuously in which water used in the game is recirculated.

It is yet another object of the invention to provide a fishing game in which fish are suspended in circulating water in an open container in which the fish are projected upwardly by jet action, and drop downwardly through a waterfall.

A further object of the invention is to provide a fishing game having fish traveling through water in an open container in which the game may be used both inside and outside of a residence or the like.

A still further object is to provide a fishing game having fish moving continuously in water in an open tray or container in which the fish are carried upwardly through a waterfall by jet action in which the game is of simple and economical construction.

Other and further objects and advantages of the present invention will be apparent from the following detailed description, drawings, and claim, the scope of the invention not being limited to the drawings themselves as the drawings are only for the purpose of illustrating a method in which the principles of this invention can be applied.

Other embodiments of the invention utilizing the same or equivalent principles may be used and structural changes may be made as desired by those skilled in the art without departing from the present invention and the purview of the appended claim.

Figure 1:
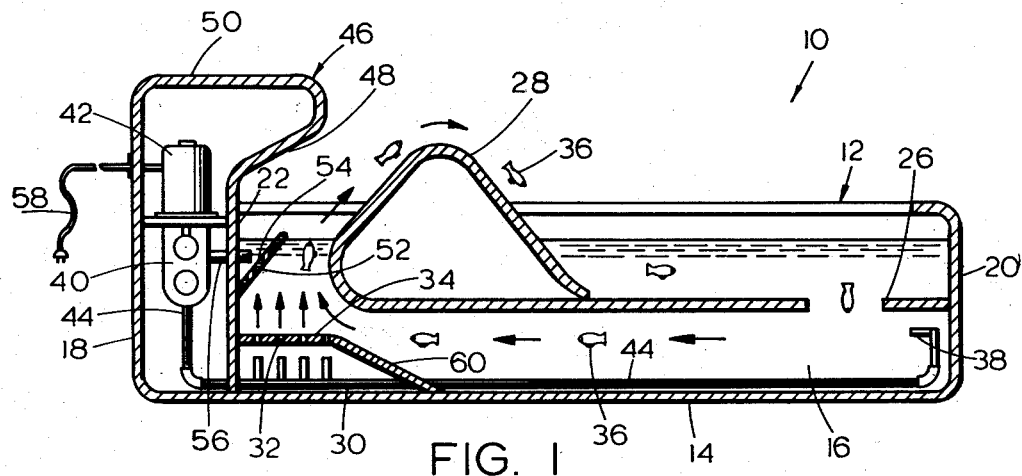
FIGURE 1 is a longitudinal section through the container of the fishing game showing fish carried through water and over a waterfall thereof.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, numeral 12 indicating an open container having a base 14, side walls 16, end walls 18 and 20, a transverse partition 22 spaced from the end wall 18, and a horizontally disposed partition 24 spaced upwardly from the base 14, and having an opening 26 in one end and an elevated portion 28 on the opposite end; numeral 30 representing nozzles providing jets positioned to discharge upwardly through openings 32 in a platform 34 for carrying fish 36 upwardly over the elevated portion 28 of the horizontal partition, numeral 38 a jet in the far end of the container positioned to circulate water with fish therein backwardly toward the opposite end of the container, numeral 40 indicating a pump driven by a motor 42 for recirculating the water, and numeral 44 indicating a pipe or conduit connecting the discharge of the pump to the nozzles or jets.

The transverse partition 22 is provided with an overhanging upper portion 46 having an inclined lower section 48 and a horizontal upper panel 50 which prevents splash from the jets and directs water from the jets forwardly over the elevated portion 28 and thereby providing a waterfall.

The partition 22 is also provided with an inclined baffle 52 having openings 54 therein for deflecting the fish outwardly over the portion 28, and above the baffle 52 is a pump intake 56. The pump motor is provided with an electric cord 58.

The platform 34 is provided with an inclined ramp 60 which guides the fish upwardly over the jets, as shown in FIGURE 1, and the ramp may extend to any suitable point.

The fish 36 are provided with a cavity 62 that supplies buoyancy, and the nose is provided with a magnet 64 or painted or coated with material having magnetic attraction. The tail is coated with non-magnetic material 66, having sufficient weight to counterbalance the magnet of the nose. The intermediate part of the body of the fish is provided with a fin 68 having an opening 70 therein, and the outer end of the opening is sealed by a plug 72 which retains weights, such as BB shot 74 in the opening. The size and quantity of shot in the opening 70 are regulated so that the fish remain suspended below the surface of the water and do not remain upon the bottom, or float on the surface of the water.

Figures 2, 3:
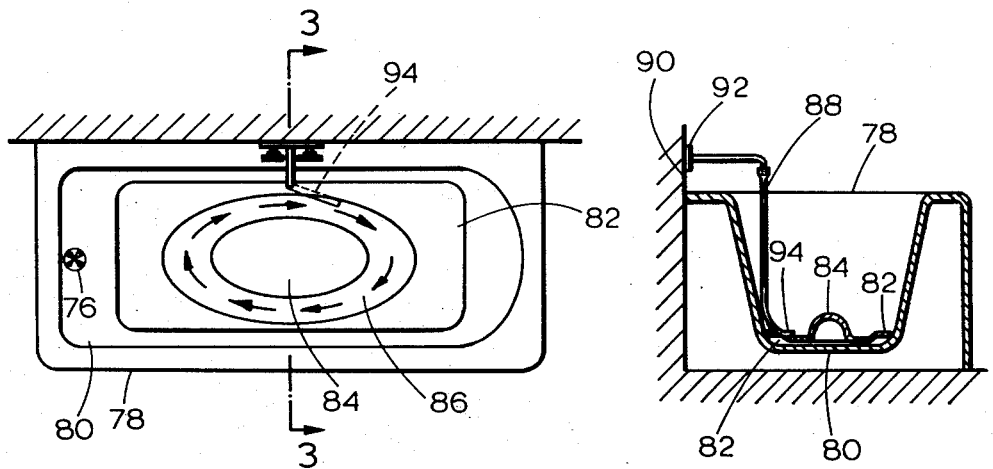
FIGURE 2 is a plan view of a bath tub showing the fishing game of this invention positioned therein.
FIGURE 3 is a cross section through the bath tub and container of the game taken on line 3—3 of FIGURE 2.
Figure 4:
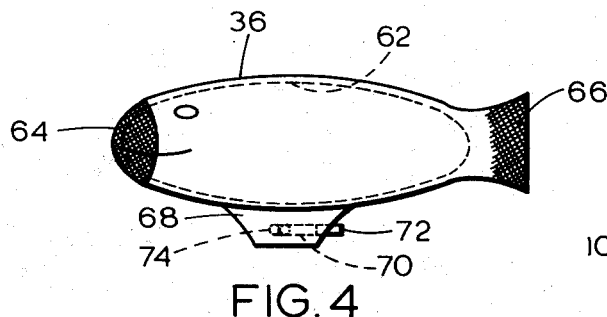
FIGURE 4 is a side elevational view of one of the fish used in the game of this invention, the fish being shown on an enlarged scale.
Figure 5:
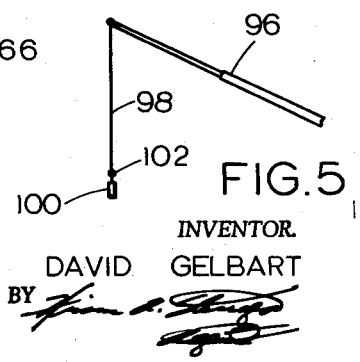
FIGURE 5 is a side elevation of the fishing pole with magnet used in the game of this invention.

In the design illustrated in FIGURES 2 and 3 the fishing game is positioned in a receptacle, such as a bathtub, and a drain 76 is set to control the elevation of water in the tub, which is indicated by the numeral 78. In this arrangement the game is positioned on a backing pad 80 which is formed with an upturned outer edge 82, and to prevent fish gathering in the center a portion of the pad is raised providing an island 84. A continuous depression 86 provides a river between the island and upturned outer edge of the pad 80. Water is supplied to the receptacle through a pipe 88 which is anchored on a wall 90 by a fitting 92 and the lower end 94 of the pipe extends at an angle, as shown in FIGURE 2, to provide circulation of water in the depression or river 86.

The fishing game may be provided with a rod or pole 96 having a line 98 thereon and the line may be provided with a hook 100 having a permanent magnet 102 thereon. The polarity of the magnet on the line 98 may be opposite to that of the magnet 64 of the fish whereby the fish will be attracted to the magnet on the line.

*Operation*

With the parts assembled as illustrated and described the duct or tube 44 may be connected to the service water of a residence, or to the pump 40, and with water supplied under pressure and discharged through the jets 30 fish floating in the water of the container are carried upwardly over the falls and forwardly over the partition 24. Upon reaching the opening 26 in the partition the fish are drawn downwardly by the jet 38 and conveyed toward the pump end of the container until they are carried upwardly again by the jets 30. The cycle is then repeated.

The container illustrated in FIGURE 1, or the assembly shown in FIGURES 2 and 3 may be provided with suitable weights, or other means for retaining the parts on the bottom of a bath tub, basin, swimming pool, or the like.

From the foregoing description, it is thought to be obvious that a fishing game constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having now described the invention that which is claimed to be new and desired to be procured by Letters Patent is:

In a fishing game, the combination which comprises an elongated container having a base, side and end walls, a transverse partition spaced from one end, and a horizontally disposed partition having openings adjacent the ends thereof and means providing an elevated portion on the end spaced from the transverse partition, nozzles providing jets in the container and positioned to discharge upwardly through the opening between the elevated portion of the horizontally disposed partition and the transverse partition, a nozzle providing a jet positioned in the end of the container opposite to the end in which the transverse partition is positioned and turned to discharge toward said transverse partition, a baffle mounted in the container and positioned to deflect water and fish over said elevated portion of the horizontally disposed partition, and means for supplying water under pressure to said jets.

References Cited in the file of this patent
UNITED STATES PATENTS

| | | |
|---|---|---|
| 774,274 | Pusterla | Nov. 8, 1904 |
| 930,613 | Pressey | Aug. 10, 1909 |
| 1,389,611 | Wood et al. | Sept. 6, 1921 |
| 1,580,046 | Jones et al. | Apr. 6, 1926 |
| 2,557,789 | Lamka | June 19, 1951 |
| 2,604,055 | Snowden | July 22, 1952 |